United States Patent [19]

Acklin et al.

[11] Patent Number: 4,490,030

[45] Date of Patent: Dec. 25, 1984

[54] APPARATUS FOR THE LIQUID-PROCESSING OF LIGHT-SENSITIVE SHEET MATERIAL

[75] Inventors: Leo Acklin; Marcel Rossier, both of Marly, Switzerland

[73] Assignee: Ciba-Geigy AG, Basel, Switzerland

[21] Appl. No.: 520,378

[22] Filed: Aug. 4, 1983

[30] Foreign Application Priority Data

Oct. 5, 1982 [CH] Switzerland ........................ 5847/82

[51] Int. Cl.[3] ........................................ G03B 3/06

[52] U.S. Cl. .................................. 354/322; 354/324; 134/64 P

[58] Field of Search ............... 354/319, 320, 321, 322, 354/324, 325; 134/64 P, 122 P

[56] References Cited

U.S. PATENT DOCUMENTS

| | | | |
|---|---|---|---|
| 3,344,729 | 10/1967 | Kitrosser | 354/321 |
| 3,372,630 | 3/1968 | Schmidt | 354/321 |
| 3,641,911 | 2/1972 | Aelterman et al. | 134/64 P |
| 3,812,870 | 5/1974 | Geyken et al. | 354/325 |
| 4,187,023 | 2/1980 | Schausberger et al. | 354/321 |
| 4,327,988 | 5/1982 | Vanhorebeek et al. | 354/320 |

*Primary Examiner*—A. A. Mathews

*Attorney, Agent, or Firm*—Harry Falber

[57] ABSTRACT

An apparatus for the liquid processing of light-sensitive material comprises a processing dish having a horizontal intermediate bottom and passage gaps, at the sheet entry end as well as at the sheet exit end, respectively, between the respective end wall of the dish and the adjacent edge of the intermediate bottom. The intermediate bottom is provided on its upper side with a screen of slender pins. The screen of pins together with a lid covering the dish delimit a passage gap for the sheets being conveyed through the passage gap in the apparatus by means of pairs of conveying and squeezing rollers in the direction indicated by an arrow T. In the dish end wall at the sheet exit end, a horizontal row of injection nozzles for the processing liquid is provided near the dish bottom. The dish end wall at the sheet entry end is provided with a horizontally extending ledge of nose-like cross section in order to deflect by 180° the stream of liquid arriving from under the intermediate bottom. Thereby, a liquid stream is generated which circulates about the intermediate bottom, while a portion of the liquid passes over the overflow constituted by the upper rim of the dish end wall on the sheet entry side, and is recirculated by a circulating pump and through the nozzles into the dish.

31 Claims, 5 Drawing Figures

APPARATUS FOR THE LIQUID-PROCESSING OF LIGHT-SENSITIVE SHEET MATERIAL

BACKGROUND OF THE INVENTION

The invention relates to apparatus for the liquidprocessing of light-sensitive sheet material comprising a substantially rectangular processing dish and means for the feeding and withdrawal of processing liquid to and from the dish including a circulating pump, as well as means for conveying the sheets through the dish.

The hitherto known apparatus of this type were not able to satisfay fully the rising demand for homogeneity of the development attained. This drawback is due, in the known devices, in particular to the lack of sufficient uniformity of the liquid flow over the light-sensitive layer. Moreover, the problem of protecting against oxidation those processing solutions which are highly sensitive thereto (developers) while being circulated, has not been solved satisfactorily in the known apparatus.

OBJECTS AND SUMMARY OF THE INVENTION

It is an object of the invention to avoid the aforementioned drawbacks and to provide an apparatus of the initially described kind which affords an optimally uniform development of the entire image area on the sheets.

This object and others which will become apparent from the further description of the invention are attained in an apparatus of the initially described kind which comprises, as characterizing features, an intermediate bottom in the processing dish, opposite end walls of the processing dish being arranged transversely to the direction of sheet movement through the dish, a gap being provided between each of the said end walls and the intermediate bottom, a plurality of nozzles disposed in a horizontal row in a first one of the said end walls, which nozzles are adapted for feeding processing liquid into the dish, and a second end wall opposite the first sidewall being of a shape such that there is imparted to the processing liquid flowing upwardly through the gap between this second end wall and a forward region of the intermediate bottom a liquid flow component which is directed toward the said first end wall.

In accordance with a preferred feature of the invention, the said second dish end wall is located at the end of the dish at which sheets are fed into the dish and comprises a projection or ledge of nose-shaped cross-section which ledge extends above the level of the intermediate bottom and parallel thereto at least across the entire width of the said intermediate bottom, thereby imparting to the above-mentioned liquid flow the said flow component directed toward the said first end wall.

According to a further preferred feature of the invention, the cross-sectional areas of the flow ducts through the feeding nozzle and the quantity of liquid delivered per second by the circulating pump are so adjusted relative to one another that the inflow velocity of the liquid is at least 0.5 meters per second, and preferably from about one to 3 meters per second.

Furthermore, a reservoir such as, preferably, an inflatable bag can be interposed in the path of circulating liquid, which reservoir is mounted on a level intermediate the processing dish and the circulating pump; and it is further preferred that a return line of the liquid-circulating path extends above the inflatable bag, and an air blocking element, in particular a floating ball valve, is inserted in this return line.

Also, preferably, the intermediate bottom bears, on its upper face, a plurality of pins or needles constituting a pin board-type screen. The pins in the screen can be arranged at a constant distance of from 5 to 15 mm, and more preferably from 6 to 10 mm from one another; while the height of the pins is preferably from 3 to 8 mm, and optimally from 4 to 6 mm. The pins can show a slight conical taper in upward direction and the diameter of their bases can be from about 1 to 2 mm. The tips of the pins can be rounded. Also, the pins and the intermediate bottom can be molded as an integral body, for instance from synthetic plastics resin material, by injection molding or blowing techniques.

The pattern of the pin screen can be a square one, and the screen lines thereof deviate from the direction of sheet transport at an angle of 13° to 19° and preferably 16°.

Along a certain length of the sheet entry path, the pins can be shortened increasingly toward the leading edge of the intermediate bottom, taken in the direction of sheet transport, so that starting from the said leading edge, the tips of the pins are located in a gradually upwardly rising enveloping plane, which preferably is inclined relative to the horizontal plane at an angle of about 15° to 30°, and optimally of 20°.

The dish sidewall on the side of sheet entry can be devised as a liquid overflow.

The sheet entry gap and the sheet exit gap can be delimited below by the respective rim of the dish, and above by the lower guide faces of a lid which covers the entire dish. In order to achieve on the sheets wetting lines which extend as far as possible straight and at right angle to the direction of sheet transport, the end wall rim at the sheet entry end is beveled to slope upwardly toward the interior at an angle of from 20° to 40°, and preferably of about 30°.

On the side of sheet entry, the lid can have a plane lower guide face which is located opposite the beveled dish rim face and deviates downwardly at a small angle from the direction of sheet transport forming with the dish rim face an angle of about 20° to 60° and comprising a visible transition via-a-vis an adjacent flatter guide face of the lid.

The dish rim on the side of the sheet exit is preferably beveled to slope upwardly and outwardly at an angle of from 20° to 60°, and preferably of about 45°.

At the sheet exit end, the lid underside can have a guide face which is slanted at a small angle upwardly in the direction of sheet transport and ends between the pin screen and the dish rim at the sheet exit end in an upwardly directed return step.

The apparatus according to the invention can comprise several stations for the processing of the sheet material in successive phases, and each of the stations can show one or several of the preferred features described hereinbefore.

In such an apparatus, the processing dishes and the collecting channels for liquid from all stations can be mounted on a common base plate which constitutes the bottoms of all processing dishes and of all collecting channels.

An open storage and buffer vessel can be preferably sealingly mounted with its upper rim on the underside of the base plate underneath each processing dish, and the collecting channels can be provided with bottom openings for discharge into such vessel. The storage and buffer vessels of all stations can be formed by a common building element.

BRIEF DESCRIPTION OF THE DRAWINGS

More features of the invention and further objects attained thereby will be apparent from the detailed description of an apparatus according to the invention illustrated in the accompanying drawings in which.

DETAILED DESCRIPTION OF THE EMBODIMENTS SHOWN IN THE DRAWINGS

Figure 1:
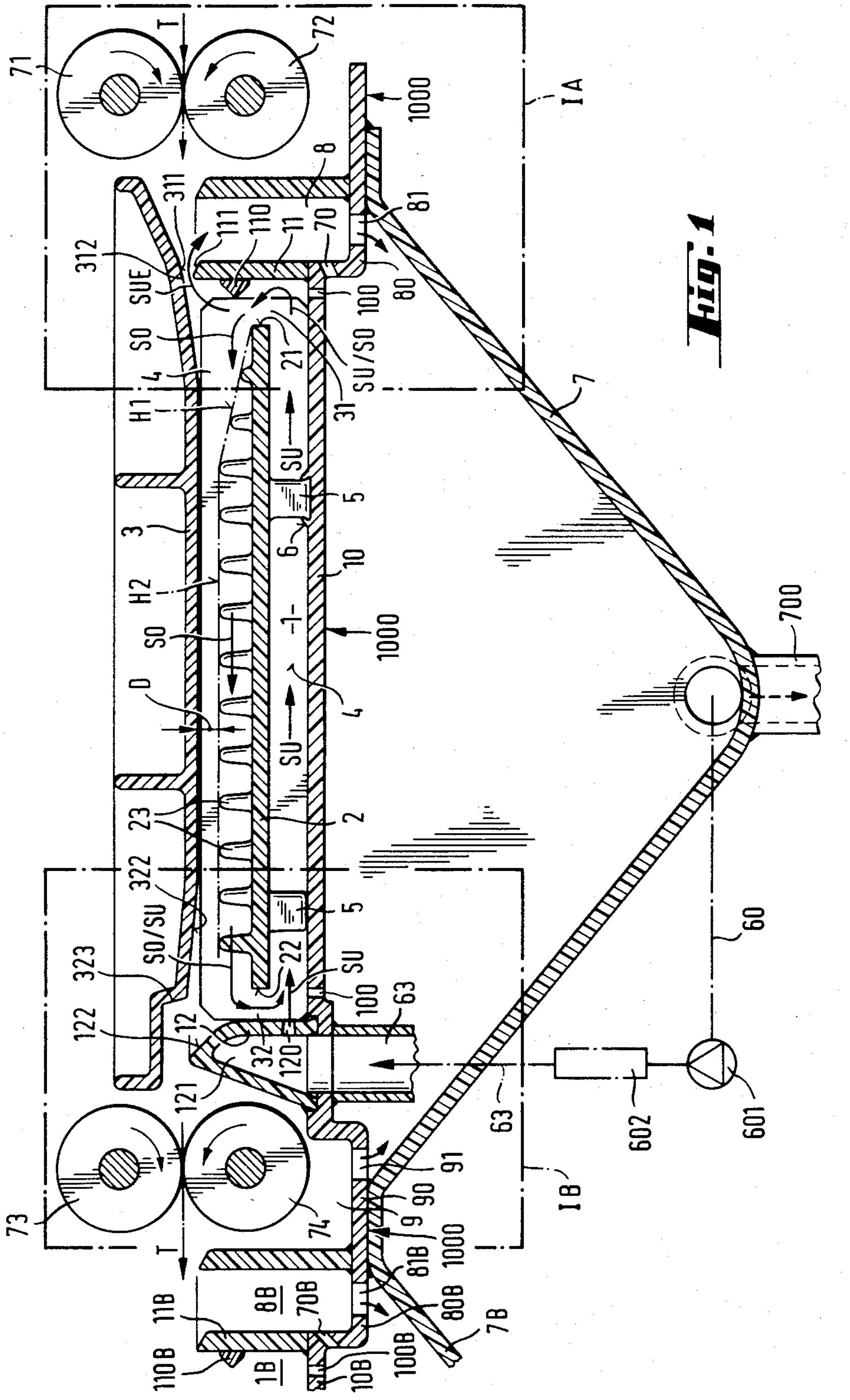
FIG. 1 shows a longitudinal sectional view of a preferred embodiment of the apparatus according to the invention in a vertical plane extending along the direction of conveyance of sheets to be processed in the apparatus.
Figures 1A, 1B:
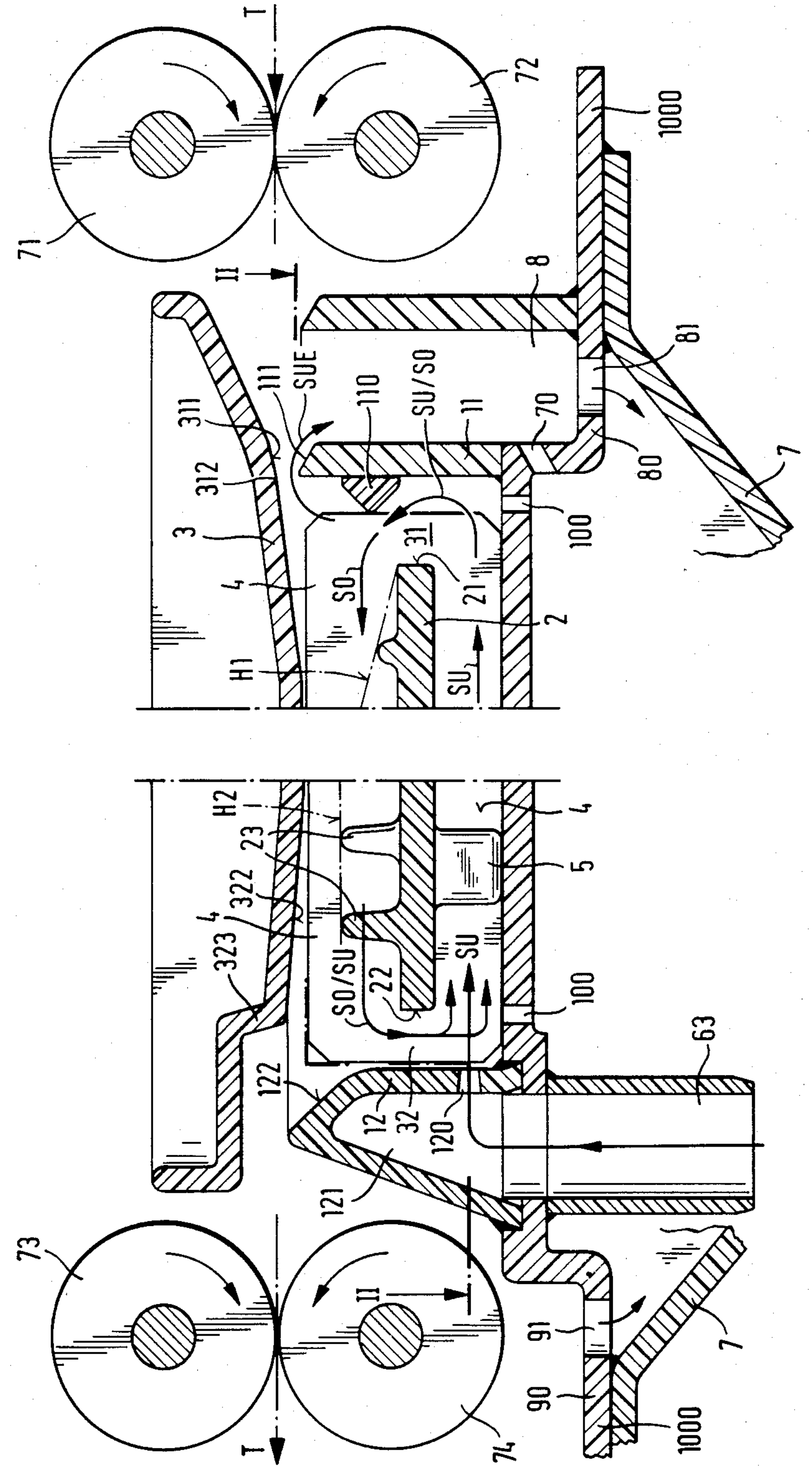
FIG. 1A is a longitudinal sectional view, on an enlarged scale, of the sheet entry region of the embodiment shown in FIG. 1 and indicated by IA therein.
FIG. 1B is a longitudinal sectional view, on an enlarged scale, of the sheet exit region of the embodiment shown in FIG. 3 and indicated by IB therein.

In these figures the processing dish bears the reference numeral 1 and the intermediate bottom has the reference numeral 2. The intermediate bottom 2 is fastened to vertical end plates 4 or similar elements which hold it in the processing dish 1 above the dish bottom 10, and its central region is supported on the dish bottom 10 by means of spacer struts 5. Preferably, the struts 5 are either firmly attached to the intermediate bottom 2 or they form an integral part thereof. At least one of the struts 5 is anchored preferably by means of a snap-in connection 6 in the dish bottom 10. Thereby, the intermediate bottom 2 is securely mounted on the dish bottom and is prevented from being inadvertently lifted off the bottom 10 in the case of strong liquid flow about the intermediate bottom 2.

The conveyance of the sheets to be treated is carried out with the aid of pairs of carrier and squeeze rollers 71,72 and 73,74. Preferably, the upper roller 71 and 73, respectively, of each pair can be driven directly from a motor, while the lower roller of each pair is free-wheeling or is connected with the drive by means of an elastic member.

Gaps 31 and 32 are left open between the sidewalls 11 and 12 of the dish 1 and extend transverse to the direction of sheet transportation T, along to edges 21 and 22 of the intermediate bottom 2. The dish end wall 12 which is located at the exit end, as seen in the direction of transportation T, is devised with a kind of hollow profile, as a liquid manifold 121 and is equipped at a level below that of the intermediate bottom 2 with a 250 mm-wide horizontal row of, for instance, twenty to twenty-five feed nozzles 120 for the processing liquid. The dish end wall 11 at the sheet entry end of the dish 1 is devised as an overflow over which the liquid passes into a collecting channel 8. Likewise, a collecting channel 9 is provided adjacent the dish end wall 12 at the sheet exit end. This channel 9 collects the liquid squeezed out of the sheets being conveyed to between the pair of rollers 73,74 and also any liquid passing over the end wall 12.

Only a first processing station is illustrated completely in the figures of the drawing, while the entire apparatus comprises several such stations, in particular three to five, which are arranged in series, one following the other. For instance, when using the apparatus for carrying out the silver color bleach process, a developing station will be the first, followed by one or two bleaching stations and, finally, by a fixing station. All processing stations are of identical construction. Therefore, of the next following processing station (B), only the "starting" portion of the processing dish 1B at the sheet entry end thereof, comprising the end wall 11B, together with the collecting channel 8B pertaining thereto, are shown in FIG. 1.

As indicated in FIG. 1, all stations can be mounted on a common base plate 1000 which constitutes in an uninterrupted manner the bottoms 10, 10B, etc., of the processing dish 1, 1B, etc., and also all bottoms 80, 90, 80B, and so forth, of the collecting channels 8, 9, 8B and so forth.

With the exception of the first pair of rollers 71,72 of the first station, and the last pair of rollers at the sheet exit end of the last station, all roller pairs 73,74 are common to two stations, one of which succeeds the other.

A storage and buffer vessel 7 is disposed below the dish 1 and the collecting channels 8 and 9 and is attached firmly at its upper rim portions to the underside of the base plate 1000, especially by gluing or welding. The ratio of the volume of the storage and buffer vessel 7 to that of the processing dish 1 amounts to 1.5 to 2.5, and is preferably about eqaul to 1.8.

The collecting channels 8 and 9 have bottom outlets 81 and 91 respectively, through which the collected liquid can flow into the vessel 7. An air vent for the vessel 7 is designated by 70; the processing dish 1 can be emptied of liquid through discharge outlets 100.

The storage and buffer vessel 7 has sidewalls which converge downwardly into the shape of a funnel. From the tip of the funnel being the lowest point of the vessel 7 a conduit 60 leads to the suction side of a circulating pump 601 whose pressure side is connected via a thermostatically adjustable heating unit 602 and a conduit 603 to the liquid manifold 121. Furthermore, a bottom outlet 700 controlled by a shut-off valve is provided at the lowest point of the vessel 7.

The processing stations which follow the above-described first station in the direction of sheet transportation T are built in the same manner as the first station and are each provided with a buffer and storage vessel, a circulating pump, and other accessories described hereinbefore.

In FIG. 1, only the end wall of the dish 1B, at the sheet entry end of the second station, the collecting channel adjacent the same, the bottom outlet and air vent thereof and one discharge outlet of the dish 1B are shown and have been designated by the reference numerals 11B, 8B, 81B, 70B and 100B, respectively.

All of the stations can be mounted on a single common base plate 1000, and in an analogous manner, all of the buffer and storage vessels 7, 7B and so forth can be made integral to constitute a single, coherent building element, the upper rim face of which can be glued or welded to the underside of the base plate 1000.

The processing liquid is pumped by the circulating pump 601 via the thermostat-controlled heating element 602 and the manifold 121 to the injection nozzles 121 through which it is introduced under pressure into the processing dish 1. Excess liquid flowing over the top of the dish end walls 11 and 12 flows via the collecting channels 8 and 9, respectively, to the storage and buffer vessel 7 and is returned from there via conduit 60 to the circulating pump 601. The discharge outlets 100 are of such narrow diameter that only a small proportion of the amount of liquid introduced through the nozzles 120 into the dish 1 will be discharged through them during operation of the apparatus.

Figure 3:
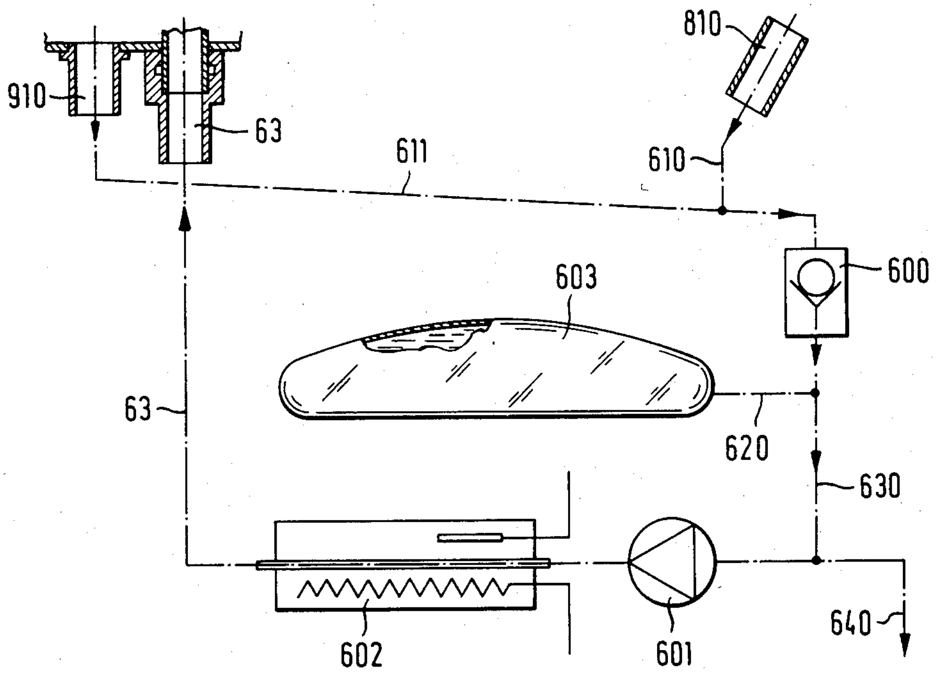
FIG. 3 is a schematic representation of a different arrangement of the auxiliary parts of the apparatus according to the invention.

In the different arrangement, shown in FIG. 3, of auxiliary parts mounted underneath the processing dish 1, the rigid-walled storage and buffer vessel 7 shown in FIG. 1 is replaced by an inflatable bag 603. Accordingly, the bottom outlets 81 and 91, respectively, of the collecting channels 8 and 9 have been equipped with connecting sockets 810 and 910, respectively, to which a hose or pipe can be connected. From each of the sockets 810 and 910 an outlet conduit 610 or 611, respectively, leads via an air-blocking element to the bag 603 which is disposed at a level between those of the processing dish 1 and the circulating pump 601. In FIG. 3, the air-blocking element is represented as a floating-ball valve 600. This valve will open only when a sufficient amount of liquid has entered the ball chamber so that the ball being of a lighter density is imparted sufficient buoyancy to be lifted off its valve seat.

The bag 603 is connected via a tap line 620 to the connecting line 630 between the ball valve 600 and the pump 601. The valve 600 prevents air from being drawn in by the pump 601 and thus avoids the danger of foam formation. If the cross-sectional areas of the suction lines 610 and 611 are chosen sufficiently large, then, under certain conditions, the air-blocking element (ball valve 600) will not be required.

The use of an inflatable bag 603 has the advantage of the liquid therein being stored in a hermetically sealed-in condition. This avoids the highly disadvantageous oxidation of the liquid or limits the same to the periods when the liquid is outside the bag. It is well-known that in particular such liquids as developers are easily oxidizable.

When using an inflatable bag 603 (FIG. 3) instead of a rigid storage and buffer vessel 7 (FIG. 1), the outlet orifices 100 (FIG. 1) will be connected to a separate shuttable discharge outlet (not shown).

The liquid circulating system and in particular its pump 601 and the cross-sectional areas of the injection nozzles 121 are so dimensioned that the liquid is introduced into the processing dish 1 at a velocity of flow of at least 0.5 meters per second, and preferably from 1 to 3 meters per second. The injection nozzles 120 preferably have an internal diameter of about 1 to 2 mm, and preferably 1.5 mm, and are arranged, spaced from one another by about 10 to 30 mm and in particular about 20 mm, in the lower quarter of the dish end wall 12. Preferably, the pumping capacity and, thereby, the injection velocity are adjustable. The end wall 11 of the processing dish 1, at the sheet entry side, is of such shape that the liquid which impinges upon its lower portion will be deflected upwardly and into the opposite direction. To this end, the wall 11 could be shaped as a whole in a suitable manner, i.e. by being vaulted outwardly. However, a straight wall has been illustrated, which wall is equipped with a horizontal deflecting ledge 110 of nose-like cross-section. This ledge can be glued or welded to the dish wall 11 or it can be manufactured integral therewith.

Due to the fact that the processing liquid is introduced through the injection nozzles 120 at a relatively high velocity, there prevails under the intermediate bottom 2 a strong liquid stream SU which is directed contrary to the direction of transportation T of the sheets. This liquid stream is deflected at the oppositely located dish end wall 11 upwardly and the larger portion of that stream is deflected to flow above the intermediate bottom 2 in the direction of the sheet transportation T. This portion of the liquid streaming over the intermediate wall 2 back toward the nozzle-containing wall 12 has been designated by an arrow SO. Another portion of the liquid impinging upon the end wall 11 flows over the latter as indicated by an arrow SUE. The return stream of liquid above the intermediate bottom 2 in the direction of sheet transportation T is drawn downwardly at the end wall 12; due to the strong ejector effect of the liquid being injected through the feed-in nozzles 120, it is then again accelerated to stream back toward the opposite end wall 11 under the intermediate bottom 2. The deflection of the liquid stream from under the intermediate bottom 2 to return above that bottom is indicated by the arrow SU/SO, while the deflection of the liquid stream from above to underneath the intermediate bottom 2 has been designated correspondingly by an arrow SO/SU. Thus, the larger portion of the liquid circulates about the intermediate bottom 2 (counter-clockwise in the illustration thereof in FIG. 1), this liquid stream being produced and maintained by the overflowing liquid which is recirculated by the pump 601, and by the ejector effect generated in the nozzles 120.

The intermediate bottom 2 is provided on its upper face with pins 23. These pins should be of slender shape and should be distributed stochastically over the same upper surface so that the liquid streaming over this upper surface of the intermediate bottom 2 is subject to absolutely equal conditions everywhere on that surface while meeting with the lowest possible flow resistance and no preferential zones of flow will be generated.

Figure 2:
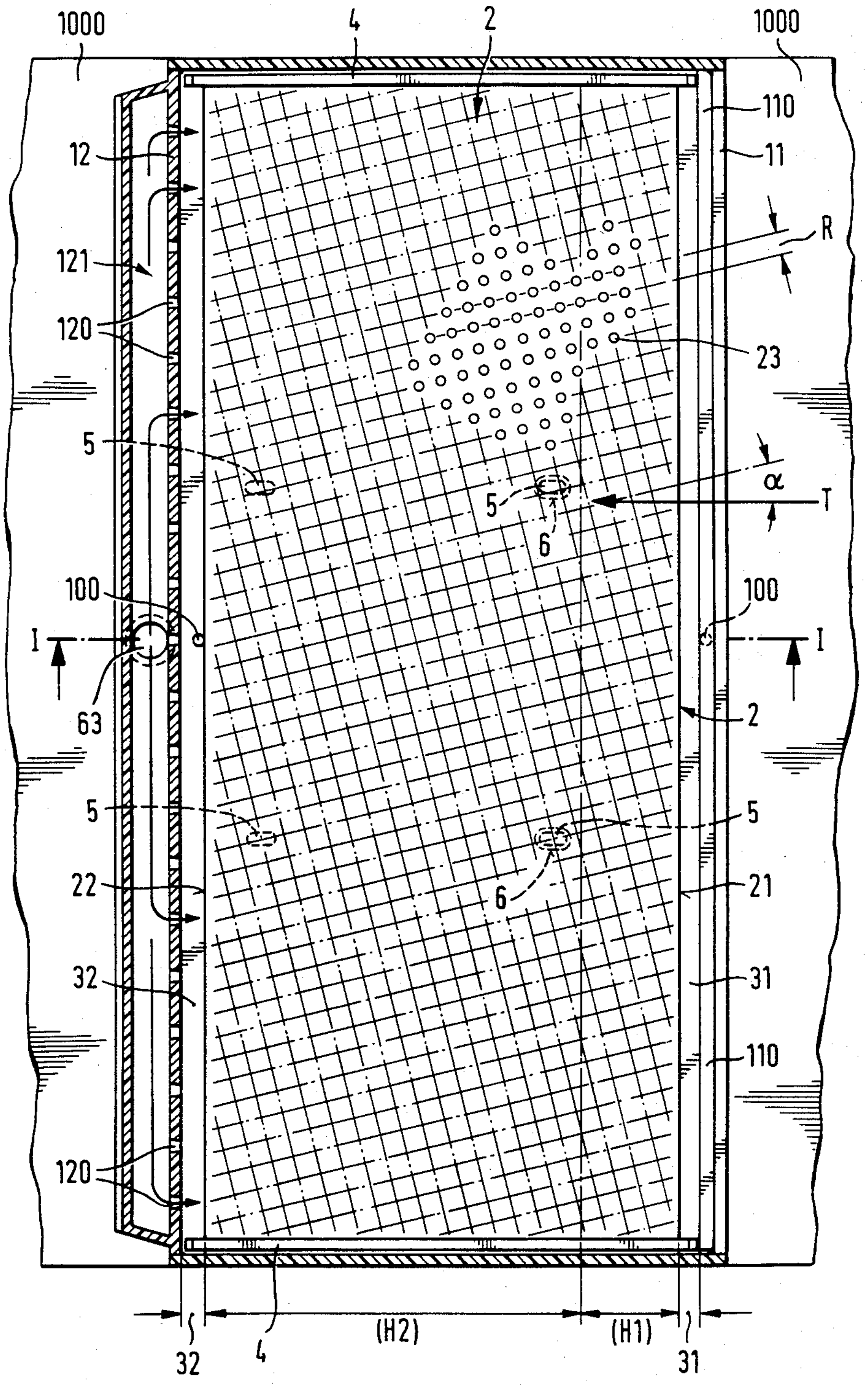
FIG. 2 shows a top view of the processing dish and the intermediate bottom therein, of the embodiment shown in FIG. 1, partially in section.

It has been found that these conditions are fully satisfied by the arrangement of the pins 23, illustrated in FIG. 2, in a square screen or grid, the screen lines of which deviate in the plane of the upper surface at an angle $\alpha$ of $16°\pm3°$ from the direction of sheet transportation T. When the average pin diameter is from about 1 to 2 mm and the height of the pin is about 3 to 8 mm, and particularly 4 to 6 mm, the screen-line distance is preferably about 5 to 15 mm and optimally 6 to 10 mm, especially for manufacturing reasons, in particular for production of the intermediate bottoms with the pins thereon as an integral piece from synthetic resin material by injection molding or blowing techniques. The pins are of upwardly slightly conically narrowing shape. Preferably, the pins have rounded tips.

In the region of the intermediate bottom 2 at the sheet entry end of the dish 1 the pins 23 have been shortened in such a manner that the plane H1 which extends through their tips constitutes a kind of sloped lifting face forming with the direction of sheet transportation T an angle of about 15° to 30° and preferably about 20° above the horizontal plane. In the remainder of the pin-bearing area the plane H2 through the pin tips extends horizontally.

Together with guide faces provided on the underside of a lid 3 which covers the entire processing dish 1, the pins 23 delimit a sheet passage gap D through which the sheets pass with their emulsion layer facing downward. The pins 23 keep open a gap for the passage of liquid between the sheets and intermediate bottom 2, thus permitting the sheet passage gap D between the pin tips and the lid 3 to be very narrow (about 1 to 3 mm). Thereby, the path through which the sheets travel is defined with considerable precision and a curving or bending of the sheets is avoided. This satisfies one of the main conditions for achieving that the time during which each point of the sheet being processed sojourns in the active part of the apparatus (e.g. the developer solution) is exactly equal.

The entry and the exit end of the sheet passage gap D which are designated hereinafter as the sheet entry gap and the sheet exit gap, respectively, are formed between corresponding upper edges of the end walls 11 and 12, respectively, and the oppositely located guide faces on the underside of the lid 3. To this end the dish rim 111 at the sheet entry end is tapered upwardly and inwardly at an angle of 20° to 40°, and preferably of about 30°. In the sheet entry gap, the lid 3 is provided on its underside with a guide face 311 which is inclined downwardly in the direction of sheet transportation and is situated exactly opposite the inclined dish rim face 111, the angle enclosed between them being of about 30° to 6°; this inclined guide face 311 forms a visible flat ridge 312 with the adjacent less inclined guide surface of the lid. In this manner, a wetting line is achieved which extends as straight as possible at a right angle to the direction of sheet transportation T.

The dish rim 122 at the sheet exit end of the dish 1 is sloped upwardly, in an analogous manner, in the direction of sheet transportation at an angle of about 20° to 60° and preferably of about 45°, and has rounded edges. The lid 3 is provided, in the same sheet exit region, with a guide face 322 which is sloped upwardly and outwardly, relative to the dish 1, and which ends in a return step 323. This step 323 is located between the sheet exit end of the intermediate bottom 2 and the sloped face of dish rim 122. By this arrangement, contact between the bath and the sheet ceases on an exactly defined straight line which extends at right angle to the direction of sheet transportation, and the amount of liquid and air bubbles entrained by the sheet is at least greatly reduced.

With regard to the operation of the apparatus according to the invention, there should also be mentioned that the sheets are seized between the conveying and squeezing rollers 71 and 72 and are initially pushed into and through the passage gap D until they are seized between the subsequently arranged rollers 73 and 74 and are then pulled onward through the passage gap. All roller pairs are driven exactly synchronously.

What is claimed is:

1. An apparatus for the liquid-processing of light-sensitive sheet material consisting essentially of at least one processing station comprising a substantially rectangular processing dish, circulating means for the feeding and withdrawal of processing liquid to and from the dish including a circulating pump, and means for conveying the sheets through said dish from a sheet entry end to a sheet exit end thereof, an intermediate bottom in said processing dish, a first and a second end wall of said processing dish, being arranged each transversely to the direction of sheet transportation through said dish, a first gap and a second gap between said first and said second end walls, respectively, and said intermediate bottom, a plurality of feeding nozzles disposed in a horizontal row in a first one of said end walls, said nozzles being adapted for feeding processing liquid into said dish, and the second end wall, opposite said first sidewall, being of a shape such that the processing liquid is caused to flow upwardly and through said second gap between said second end wall and a forward region of said intermediate bottom and such that there is imparted to said upward flowing processing liquid a liquid flow component which is directed toward said first end wall.

2. The apparatus of claim 1, wherein said second dish end wall is located at a sheet-entry end of said dish and comprises a ledge of nose-shaped cross-section which ledge extends above the level of said intermediate bottom and parallel thereto at least across the entire width of said intermediate bottom, thereby imparting to the said liquid flow said flow component directed toward said first end wall.

3. The apparatus of claim 1, wherein said feeding nozzles have flow ducts whose cross-sectional areas are so adjusted relative to the quantity of liquid delivered per second by said circulating pump that the inflow velocity of the liquid into said dish is at least 0.5 meters per second.

4. The apparatus of claim 3, wherein said inflow velocity of said liquid into said dish is from about one to three meters per second.

5. The apparatus of claim 1, wherein said circulating means comprise a path of circulating liquid and a reservoir interposed in said liquid path, said reservoir being mounted on a level intermediate said processing dish and said circulating pump.

6. The apparatus of claim 5, wherein said reservoir is an inflatable bag.

7. The apparatus of claim 6, wherein said liquid-circulating path comprises an air-blocking element inserted in said liquid path upstream of and on a higher level than said inflatable bag.

8. The apparatus of claim 7, wherein said air-blocking element is a floating-ball valve.

9. The apparatus of claim 1, wherein said intermediate bottom has front and rear edges and an upper face, and comprises a plurality of pins constituting a pin board-type screen mounted on said upper face.

10. The apparatus of claim 9, wherein said pins have a slight conical taper in upward direction and the diameter of their bases is from about 1 to 2 mm each.

11. The apparatus of claim 9, wherein the height of said pins of from 3 to 8 mm.

12. The apparatus of claim 9, wherein the height of the pins ranges from 4 to 6 mm.

13. The apparatus of claim 9, wherein said pins in the screen are arranged at a screen line distance of from 5 to 15 mm.

14. The apparatus of claim 13, wherein the screen line distance is from 6 to 10 mm.

15. The apparatus of claim 9, wherein said pins and said intermediate bottom are molded as an integral body from synthetic plastics resin material.

16. The apparatus of claim 9, wherein said pin screen has a square pattern, and the lines of pins in said screen deviate at an angle of $16°\pm3°$ from the direction of sheet transportation over said dish.

17. The apparatus of claim 1, wherein said processing dish comprises a sheet entry path therethrough and said pins are shortened increasingly along a certain length of said sheet entry path toward the front edge of said intermediate bottom, taken in the direction of sheet transportation, whereby starting from said front edge, the tips of said pins define a gradually upwardly rising plane.

18. The apparatus of claim 17, wherein said pin tipdefined rising plane is inclined relative to the horizontal plane at an angle of about 15° to 30°.

19. The apparatus of claim 18, wherein said angle of inclination of said rising plane is 20°.

20. The apparatus of claim 1, wherein the second end wall is at the sheet entry end of said dish and is devised as a liquid overflow.

21. The apparatus of claim 1, wherein said processing dish has a rim delimiting a sheet entry gap and a sheet exit gap from below, and wherein said sheet conveying means comprise a lid covering the entire dish and having lower guide faces which delimit said sheet entry gap and said sheet exit gap from above.

22. The apparatus of claim 21, wherein said second end wall, at the sheet entry end, has a rim face which is beveled to slope upwardly toward the sheet entry path at an angle of from 20° to 40°, thereby to achieve, on the sheets traveling through the sheet entry path wetting lines which extend substantially straight and at right angle to the direction of sheet transportation.

23. The apparatus of claim 22, wherein the second wall rim is beveled at an angle of about 30°.

24. The apparatus of claim 22 wherein, at the sheet entry end, the lid has a plane lower guide face which is located opposite the beveled rim of said second end wall and which is inclined to deviate downwardly at a small angle from the direction of sheet transportation, forming with said second end wall rim face an angle of about 20° to 60° and comprising a visible transition vis-a-vis an adjacent less inclined guide face of the lid.

25. The apparatus of claim 21, wherein said first end wall, at the sheet exit end, has a rim face being beveled to slope upwardly and outwardly at an angle of from 20° to 60°.

26. The apparatus of claim 25, wherein said first end wall rim face is beveled at an angle of about 45°.

27. The apparatus of claim 25 wherein, at the sheet exit end, the lid has a lower guide face which is slanted at a small angle upwardly in the direction of sheet transportation and comprises an upwardly directed return step, at which said slanted lower guide face ends between said pin screen and said first end wall rim face.

28. An apparatus as defined in claim 1, comprising a plurality of stations wherein each station comprises collecting channels on the outside of said first and second end walls of said processing dish, said apparatus further comprising a common base plate on which the processing dishes and the collecting channels for liquid from all stations are mounted, said common base plate constituting the bottoms of all processing dishes and of all collecting channels.

29. The apparatus of claim 1, further comprising an open storage and buffer vessel having an upper rim and being sealingly mounted with said upper rim on the underside of said processing dish.

30. The apparatus of claim 28, further comprising an open storage and buffer vessel having an upper rim and being sealingly mounted with said upper rim on the underside of said base plate underneath each processing dish, and said collecting channels having bottom openings for discharge of liquid into said vessel.

31. The apparatus of claim 29, wherein the storage and buffer vessels of all stations constitute an integral building element.

* * * * *